United States Patent [19]

Janssen et al.

[11] Patent Number: 4,948,290

[45] Date of Patent: Aug. 14, 1990

[54] T-CONNECTION BETWEEN TWO PROFILES, PARTICULARLY CROSS-BAR PROFILE AND POST PROFILE OF A FACADE

[75] Inventors: Pieter Janssen; Guenter Bock, both of Bielefeld; Helmut Scheuer, Enger, all of Fed. Rep. of Germany

[73] Assignee: Schüco International GmbH & Co., Bielefeld, Fed. Rep. of Germany

[21] Appl. No.: 329,126

[22] Filed: Mar. 24, 1989

[30] Foreign Application Priority Data

Mar. 24, 1989 [DE] Fed. Rep. of Germany ....... 3809951

[51] Int. Cl.⁵ ................................................ B25G 3/00
[52] U.S. Cl. ..................................... 403/255; 403/230; 403/406.1
[58] Field of Search ............... 403/255, 254, 230, 231, 403/406.1

[56] References Cited

U.S. PATENT DOCUMENTS

| | | | |
|---|---|---|---|
| 4,572,694 | 2/1986 | Hoeksema | 403/255 X |
| 4,597,472 | 7/1986 | Hjelm | 403/255 X |

FOREIGN PATENT DOCUMENTS

| | | | |
|---|---|---|---|
| 2376318 | 9/1978 | France | 403/406 |
| 2448065 | 10/1980 | France | 403/231 |
| 838110 | 6/1981 | U.S.S.R. | 403/406 |

*Primary Examiner*—Andrew V. Kundrat
*Attorney, Agent, or Firm*—Michael J. Striker

[57] ABSTRACT

A T-connection between two profiles, particularly a cross-bar profile and a post profile of a facade each having an inner chamber, comprises a U-shaped connector located in the inner chamber of one of the profiles, the connector having an end plate provided with a guiding opening and having two opposite edges and two plateshaped legs extending from the opposite edge of the end plate near inner surfaces of the one profile, and a flange bolt guided in the guiding opening of the connector in a non-rotatable manner and extending into the inner chamber of another one of the profiles through an opening in a wall of the other profile so as to be fixed relative to the latter. The flange pin has a portion extending outwardly beyond the end plate and provided with at least one arresting opening. The connector has a toggle lever-like bridge web extending between the plate-shaped legs and provided with a threaded opening. The connection further has a clamping screw extending through the threaded opening of the bridge web and having a head abutting against the end wall. The bridge web has a central web part and web parts which are connected with the legs and extend at an obtuse angle relative to the latter. The threaded opening for the clamping screw is provided in the central web part.

10 Claims, 4 Drawing Sheets

T-CONNECTION BETWEEN TWO PROFILES, PARTICULARLY CROSS-BAR PROFILE AND POST PROFILE OF A FACADE

BACKGROUND OF THE INVENTION

The present invention relates to a T-connection between two profiles, particularly a cross-bar profile and a post profiles of a facade.

Connections of the above mentioned general type are known in the art. In a known connection of the above profiles each having an inner chamber, a U-shaped connector is fixed in the inner chamber of the cross-bar profile at the end side facing the connecting joint. The connector includes an end plate provided with at least one guiding opening for spring-loaded flange bolt having a rectangular abutment plate, and two plate-shaped legs extending from two opposite edges of the end plate near the associated inner surfaces of the cross-bar profile, wherein the flange bolt is guided in a non-rotatable manner in the connector body and extends through the connecting joint and an opening in the wall of the post profile into the inner chamber of the post profile so as to be fixed relative to the post profile.

Such a T-connection is disclosed for example in the German document DE-OS No. 3,419,294.8. Here the plate-shaped legs of the U-shaped connector body are provided with an adhesive prior to the insertion into the cross-bar profile, and the connector body after the insertion in an end side of the cross-bar profile is fixed by screws extending through the cross-bar profile, in addition to the glueing between the legs and the inner side of the cross-bar profile.

The known connector body has two flange bolts which are spring-loaded, provided with a rectangular abutment plate, and guided in the connector body in a non-rotatable manner. The flange bolts during the connection of the cross-bar profile with a post profile extend through an opening into the inner chamber of the post profile and have a transverse opening. A pin is driven through the transverse opening from outside through a mounting opening in the post profile for anchoring the flange bolts on the post profile.

SUMMARY OF THE INVENTION

Accordingly, it is an object of the present invention to provide a T-connection of the above mentioned general type, which is designed so that the T-connector both in the cross-bar profile and in the post profile can be fixed in a simple manner, without screwing the connector body with the cross-bar profile and without anchoring the bolts to the flange bolts in the inner chamber of the post profile by a pin extending from the outside of the post profile.

In keeping with these objects and with others which will become apparent hereinafter, one feature of the present invention resides, briefly stated, in that the flange pin in the region of its length extending outwardly beyond the end plate is provided with at least one holding recess, and a toggle lever-shaped bridge web is provided between two plate-shaped legs, wherein the bridge web has a threaded opening for a clamping screw having a head abutting against the end wall, and the bridge web is composed of a central web part and two web parts connected with the legs and extending at an obtuse angle to the legs, while the threaded opening for the clamping screw is arranged in the central web part.

By the tensioning of the clamping screw, after the insertion of the connector body in the end side of a cross-bar profile, the legs provided with adhesive are pressed against the associated inner surfaces of the cross-bar profile so that during binding of the glue a reliable connection between the plate-shaped legs of the connector body and the cross-bar profile is produced.

Since the front end of the flange bolt or flange bolts is provided with an holding recess, the flange bolt guided through an opening in the inner chamber of the post profile can receive a part of an opening wall in its holding recess. Thereby, a form-locking connection between the flange bolt and the post profile is produced.

A screw or a spring-loaded holding pin can be used as further connecting means between the cross-bar profile and the post profile. The spring-loaded holding pin can be spring-biased into a holding recess of the post profile.

In accordance with a further embodiment of the present invention, the flange bolt is provided with two holding recesses which are spaced from one another in the longitudinal direction and are offset relative to one another by an angular distance of 180°.

Still another feature of the present invention is that the abutment plate of a flange bolt is guided between two walls, and the free length of the bolt extending outwardly beyond the end plate during the abutment of the abutment plate against the abutment surface of the connector is smaller than the maximal guiding length of the wall.

During pressing of the flange bolt against the action of the spring the connector body til the abutment plate is located outside of the walls, the flange bolt can be turned by 180° and released. Thereby the abutment plate under the action of the spring is again moved in the region of the guiding walls til the front abutment. A second holding opening can be used for the form-locking connection of the bolt with the post profile.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
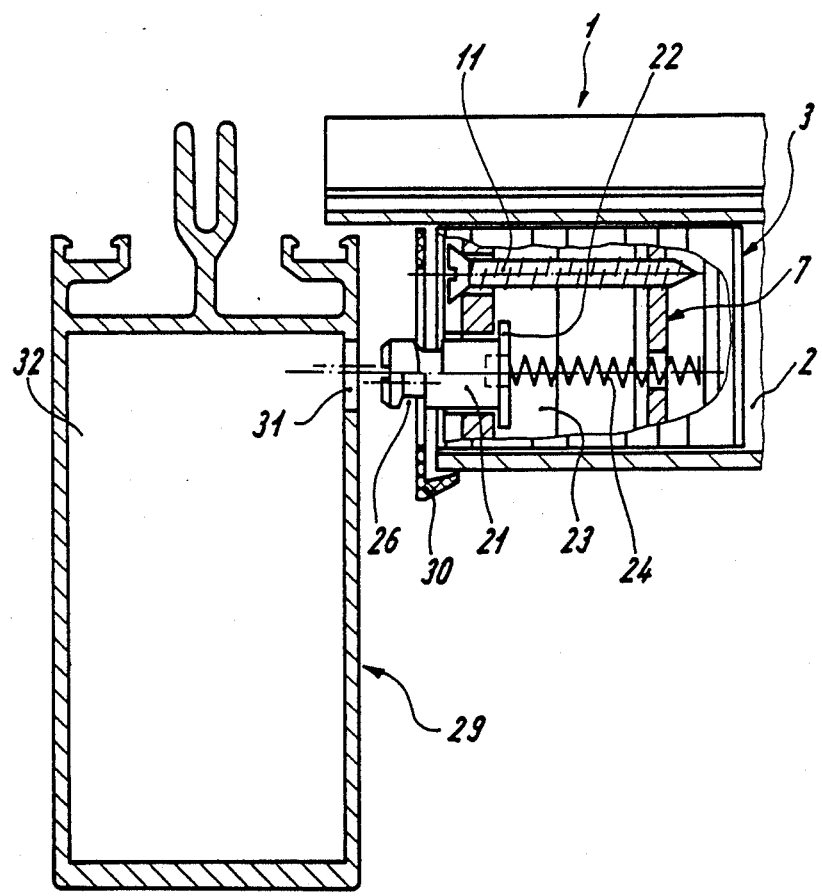
FIG. 1 is a view showing a cross-bar profile provided with a connector and a post profile, in section with a sealing collar located therebetween before the assembly of these parts.
Figure 5:
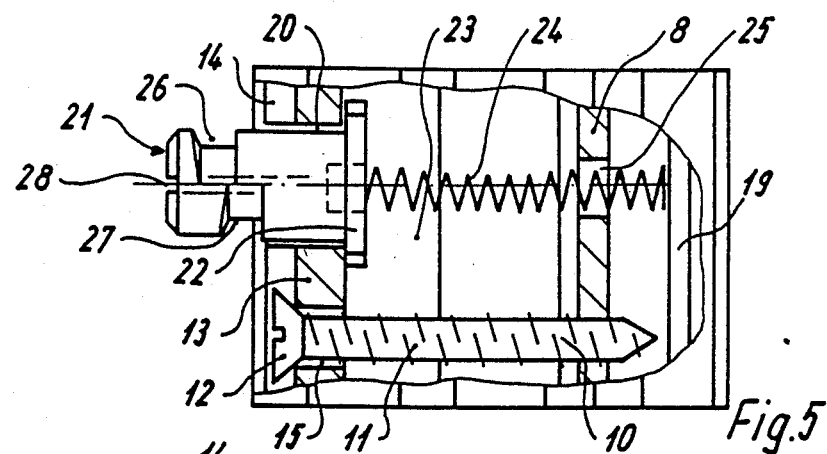
FIG. 5 is a view showing a section taken along the line V—V in FIG. 4.
Figure 6:
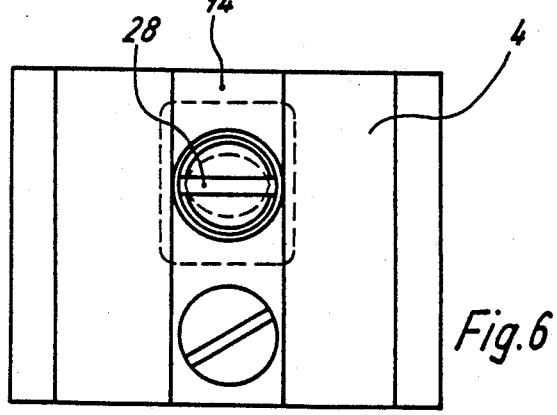
FIG. 6 is a view as seen in direction of arrow VI in FIG. 4.

In the embodiment shown in FIG. 1 connector 3 is fixed at an end side of a cross-bar profile 1 in its inner chamber 2. The connector 3 has a construction which is shown in detail in FIGS. 4–6.

Figure 4:
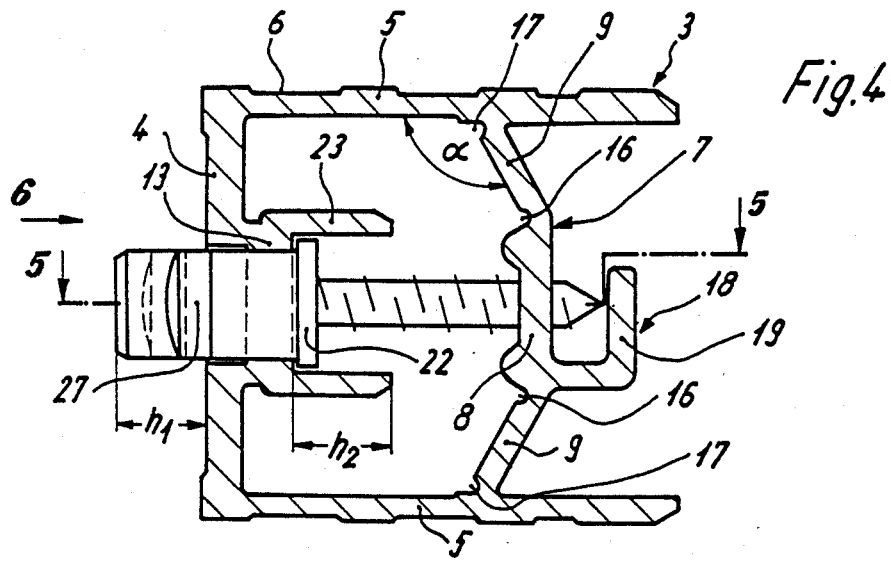
FIG. 4 is a view showing a section of a connector with a flange bolts in accordance with the present invention.

As shown in FIG. 4, the connector has a connector body which is U-shaped in a longitudinal cross-section and has an end plate 4 with two plate-shaped legs 5 extending at its side edges. The plate-shaped legs 5 have outwardly open recesses 6 for receiving an adhesive. The legs of the connector body are coated with adhesive prior to the insertion into the inner chamber of cross-bar profile 1.

A toggle lever-shaped bridge web 7 extends between the plate shaped legs 5 and formed of one-piece integrally with the latter. It has a central web part 8 and web parts 9 which extend from the central web part 8 to the legs 5 at an obtuse angle.

The central web part 8 is provided with a threaded opening 10 for a clamping screw 11. The clamping screw 11 abuts with its head 12 against the end plate and more particularly against a bottom 13 of a groove 14 which is provided in the end plate. The groove 14 extends over the whole height of the end plate 4. The bottom 13 is provided with a throughgoing opening 15 for the threaded shaft of the clamping screw 11. During pulling of the clamping screw, the bridge web 7 is deformed and spreads the plate-shaped legs 5 outwardly.

For supporting and simplifying the deformation of the bridge web during pulling of the screw, channels 16 and 17 are provided at the transition between the central web part 8 and the web parts 9 and at the transition from the web parts 9 and the legs 5.

An angular strip 18 is arranged at the rear side of the central web part. It has a strip part 19 which extends parallel to the central web part. It limits the stroke of the clamping screw and thereby the spreading of the legs 5.

The bottom 13 is further provided with a throughgoing opening 20 for a flange bolt 21. The flange is formed by an abutment plate 22 having a rectangular contour. The abutment plate is guided between two walls 23 which extend from the bottom 13 of the groove in direction to the bridge web 7. The walls 23 form a guiding path with a length $h_2$, while the length of the flange bolt part extending over the end plate when the abutment plate 22 abuts against the abutment surface of the connector is $h_1$. The value of $h_1$ must be smaller than the value of $h_2$ to enable non-rotatable advancement of the flange bolt 21 until an end surface of the flange bolt lies flush with the end surface of the end plate 4. Non-rotatable advancement is possible only when the abutment plate 22 of the flange bolt 21 is guided between the walls 23. Therefore, the length of the guiding path of walls 22 should exceed the length of the free end of the flange bolt 21''.

The flange bolt 21 is associated with a spring 24. The spring extends through an opening 25 of the central web part 8 and is supported with its rear end against the strip part 19.

The front end of the flange bolt 21 is provided with two holding recesses 26 and 27 which extend in a longitudinal direction. The holding recesses are offset relative to one another at an angular distance of 180°.

The front end surface of the flange bolt is provided with a slot 28 for inserting a screwdriver. With this screwdriver, the flange pin can be pressed against the action of the spring 24 into the interior of the connector body, until the abutment plate 22 is located outside of the walls 23 and the end surface of the flange bolt 21 is located inside with respect to the end surface of the end plate 4. The flange pin can be turned by 180° to bring the holding recess 26 to the lower position for using this holding recess then during the connection of the cross-bar profile with the post profile.

Figure 2:
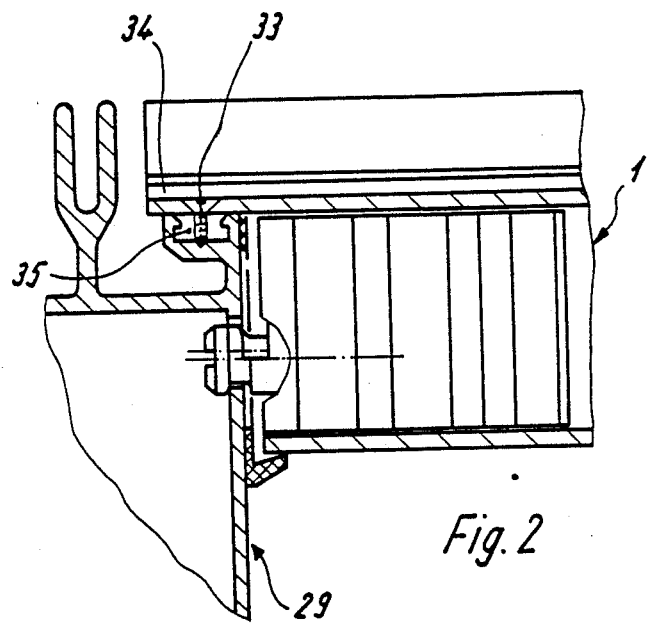
FIG. 2 is a view showing the parts of FIG. 1 after the connection and in section.

The holding recess 26 is utilized for the form-locking connection of the flange bolt 21 with a post profile 29 in the embodiment of FIGS. 1 and 2. In this embodiment a sealing sleeve 30 is arranged in the connecting region.

The front part of the flange pin is guided through an opening 31 into the inner chamber 32 of the post profile for connecting both profiles, and then brought to the position which is shown in FIG. 2.

Figure 3:
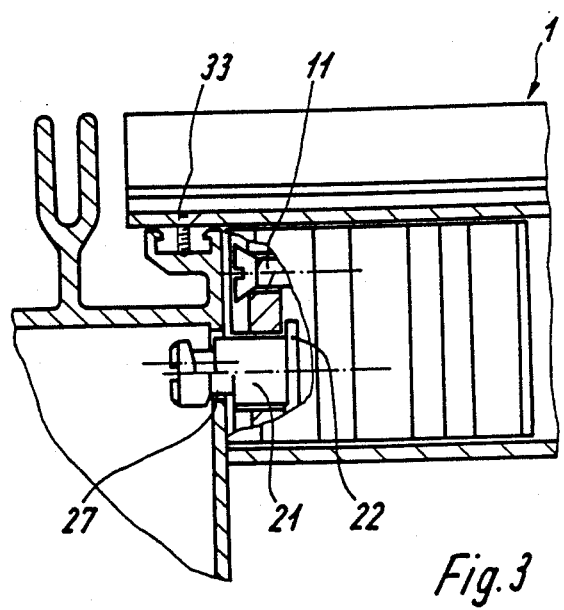
FIG. 3 is a view showing a connection between the cross-bar profile and the post profile without a sealing collar in the connecting region.

As long as a connection between the cross-bar profile 1 and the post profile 29 must be performed without the sealing collar 30, the rear holding recess 27 of the flange bolt 21 is used. Such a connection is shown in FIG. 3.

For reliable connection between the cross-bar profile 2 and the post profile 29, a screw 33 is provided between both profiles in the region of the anchoring grooves 34 and 35 for the sealing profile.

Figure 7:
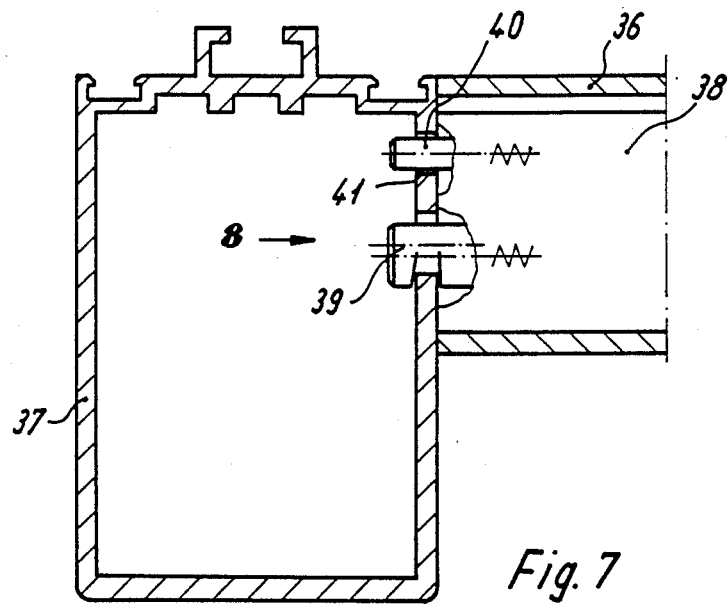
FIG. 7 is a view showing a further embodiment of a butt connection between the cross-bar profile and the post profile in section.
Figure 8:
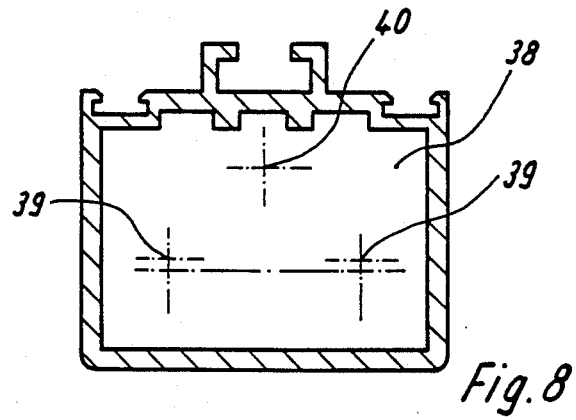
FIG. 8 is a view as seen in direction of the arrow VIII with a schematic showing of the connector in accordance with the present invention.

FIGS. 7 and 8 show another embodiment of a butt connection between the cross-bar profile 36 and the post profile 37. In this connection a connector 38 is provided with two flange bolts 39 located in one plate near one another. It has further a spring-loaded holding pin 40 which is spring-biased in an opening 41 of the post profile.

It will be understood that each of the elements described above, or two or more together, may also find a useful application in other types of constructions differing from the types described above.

While the invention has been illustrated and described as embodied in a T-connection between two profiles, for example a cross-bar profile and a post profile of a facade, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A T-connection between two profiles, particularly a cross-bar profile and a post profile of a facade each having an inner chamber, the connection comprising a U-shaped connector located in said inner chamber of one of said profiles, said connector having an end plate provided with a guiding opening and having two opposite edges and two plate-shaped legs extending from said opposite edge of said end plate near inner surfaces of said one profile; a flange bolt guided in said guiding opening of said connector in a non-rotatable manner and extending into said inner chamber of another one of said profiles through an opening in a wall of the other profile so as to be fixed relative to the latter, said flange bolt having a portion extending outwardly beyond said end plate and provided with at least one holding recess, said connector having a toggle lever-like bridge web extending between said plate-shaped legs and provided with a threaded opening; and a clamping screw extending through said threaded opening of said bridge web and having a head abutting against said end wall, said bridge web having a central web part and web parts which are connected with said legs and extend at an obtuse angle relative to the latter, said threaded opening for said clamping screw being provided in said central web part.

2. A T-connection as defined in claim 1, wherein said flange bolt has two such holding recesses which are offset relative to one another in a longitudinal direction and arranged at an angular distance of 180° relative to one another.

3. A T-connection as defined in claim 2, wherein said flange bolt has an abutment plate; and said connector further comprising two walls guiding said abutment plate over a maximal guiding length $h_2$, said flange bolt having a free length $h_1$ which extends beyond said end plate when said abutment plate abuts against said connector and which is smaller than said maximum guiding length $h_2$.

4. A T-connection as defined in claim 1, wherein said bridge web has a rear side provided with an angular strip which has a strip part extending parallel to said central web part, said strip part limiting a stroke of said clamping screw.

5. A T-connection as defined in claim 4; and further comprising a spring which is associated with said flange bolt, said strip part forming an abutment surface for an end of said spring.

6. A T-connection as defined in claim 1, wherein said end plate has an outwardly open groove with a bottom, said bottom of said groove having a throughgoing opening for said flange bolt and a throughgoing opening for said clamping screw.

7. A T-connection as defined in claim 6, wherein said bottom of said groove has a rear side with a part which forms an abutment surface for said abutment plate.

8. A T-connection as defined in claim 6; and further comprising two walls for guiding said abutment plate of said flange bolt, said walls extending from a rear side of said bottom of said groove in direction of said bridge web.

9. A T-connection as defined in claim 1; and further comprising another such flange bolt, said flange bolt being arranged near one another; and a spring-loaded arresting pin engaging in an opening of a wall of said other profile.

10. A T-connection as defined in claim 9, wherein said profiles form a connecting joint, said wall of said other profile being located adjacent to said joint, said spring-loaded holding pin extending through said opening of said wall located adjacent to said joint.

* * * * *